United States Patent [19]

Schertler

[11] 4,395,049
[45] Jul. 26, 1983

[54] METALLIC SEALING DEVICE FOR A HIGH-VACUUM CLOSURE

[75] Inventor: Siegfried Schertler, Haag, Switzerland

[73] Assignee: Vat Aktiengesellschaft Für Vakuum-Apparate-Technik, Haag, Switzerland

[21] Appl. No.: 215,404

[22] Filed: Dec. 11, 1980

[30] Foreign Application Priority Data

Dec. 19, 1979 [DE] Fed. Rep. of Germany ....... 2951150

[51] Int. Cl.³ .............................................. F16L 17/00
[52] U.S. Cl. ................... 277/236; 277/169; 285/336; 285/DIG. 18
[58] Field of Search ................ 277/236, 177, 11, 168, 277/169, 172; 285/DIG. 18, DIG. 19, 336

[56] References Cited

U.S. PATENT DOCUMENTS

| 392,931 | 11/1888 | Prindle | 277/169 |
| 2,832,614 | 4/1958 | Settle | 277/169 |
| 3,262,722 | 7/1966 | Gastineau et al. | 277/11 |
| 3,537,733 | 11/1970 | Martin | 277/236 |

FOREIGN PATENT DOCUMENTS 885304 12/1961 United Kingdom ................ 277/236

Primary Examiner—Robert I. Smith
Attorney, Agent, or Firm—Toren, McGeady and Stanger

[57] ABSTRACT

In a high-vacuum closure, a metallic sealing ring is positioned between a first and a second sealing surface. The sealing surfaces are each formed of a metallic surface of revolution and are coaxially arranged. When the sealing surfaces are moved between the open and closed positions, the sealing ring rolls on the sealing surfaces. The sealing ring is shrunk on one of the sealing surfaces for securing it in place.

5 Claims, 7 Drawing Figures

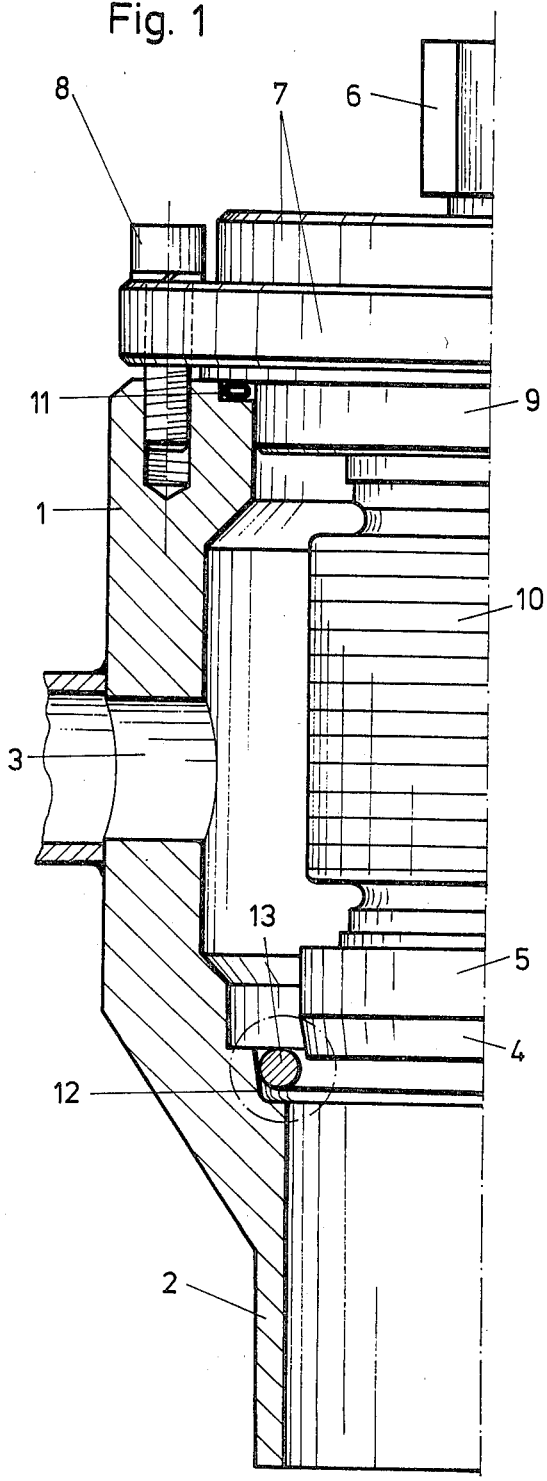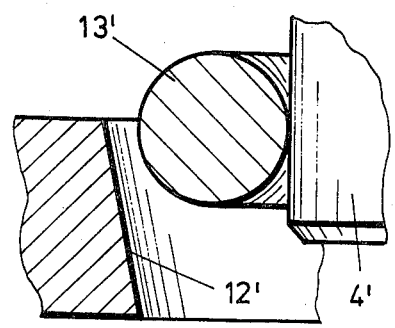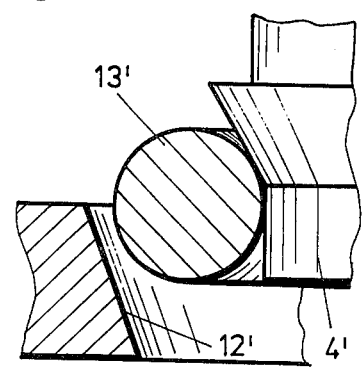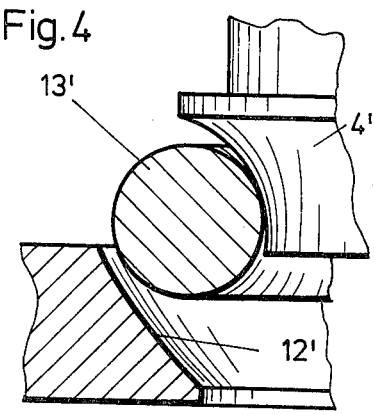

METALLIC SEALING DEVICE FOR A HIGH-VACUUM CLOSURE

SUMMARY OF THE INVENTION

The present invention is directed to a metallic sealing device for a high-vacuum closure, particularly for use on a high-vacuum valve with a first sealing surface formed as a surface of revolution and a second sealing surface also formed as a surface of revolution and arranged coaxially with the first sealing surface. The two sealing surfaces are adjustable relative to one another in the axial direction and a metallic sealing ring is positioned between the two sealing surfaces. The sealing ring has a cross-sectional configuration capable of rolling on the two sealing surfaces when the sealing device is moved between the open and closed positions.

A sealing device of this type is disclosed in German Offenlegungsschrift No. 29 09 223. In this known construction, the sealing rings have a C-shape open cross-section and, as a rule, the sealing ring is covered, at least at the outside, with a layer of ductile metal. Further, in the open position of the sealing device, the sealing ring bears loosely against the sealing surfaces. When the sealing device is opened and closed repeatedly, it can be expected that the contact of the sealing ring with the two sealing surfaces occurs along different closed lines, because the above-mentioned loose contact of the sealing ring, may cause changes in the position of the sealing ring relative to the sealing surfaces. These changes in position can be the result of various reasons, however, when the sealing device is opened and closed frequently, the changes in position inevitably lead to leakage. In closures for UHV-plants the seal is considered to be sufficient when the leakage rate is less than $1.10^{-11}$ mbar. 1/sec., measured in helium (this rate corresponds approximately to a "hole" with a diameter of a few helium atoms). Further,. the open, C-shaped hollow profile of such sealing members is not suited to the absorption of relatively high sealing pressures. The sealing forces required for such very tight seals lead to a plastic deformation of such open, C-shaped hollow profiles so that only a small number of opening-closing procedures can be performed.

It has also been suggested in high-vacuum closures to use all-metal valves in which hard-metallic sealing members with solid cross-sections interact, German Offenlegungsschrifts 26 25 796 and 25 23 152. In such closures, the sealing parts are formed of a spring-hard material and the valve seat of an alloy of high-grade steel with chromium, nickel, molybdenum and/or titanium. The locking member is in the form of an annular disc held in the region of its outer circumference with its inner edge rounded off or its outer contour is rounded off and it is held at its inner circumference. The rounded-off edge interacts with the sealing member. The locking member is fastened either to the valve housing or to the adjustable valve part. Due to the rounding off of the edges, the sealing part can roll on the sealing member under a high pressure when the valve is actuated with the sliding and resulting destruction of the valve because of insufficient lubrication being eliminated in such high-vacuum valves. Slight relative movements between sealing members due to temperature changes when the valve is closed and resulting in thermal expansion, can be absorbed by such valves without leading to damage of the sealing surfaces disposed in direct operative engagement. By means of such valve arrangements it is possible to achieve a degree of tightness of $1.10^{-9}$ mbar0.1/sec., measured with helium, for several thousand closing procedures without requiring an increase in the closing force.

Although these all-metal sealing devices have proved themselves, they are not without disadvantages, because such all-metal sealing devices are used in UHV-vacuum plants, they must be heated for the degasification of the surfaces. In the heating operation, temperatures up to 450° are required. Special heating devices serve for supplying heat and they are arranged outside of the sealing device with the heat flowing from the outside into sealing device so that there is a gradual penetration of the heat from the exterior to the interior of the sealing device. During subsequent cooling, the heat flows from the inside toward the outside, that is, during heating the temperature drop is toward the inside and during cooling the temperature drops toward the outside. The vacuum present in the sealing arrangement has a high insulating capacity. Accordingly, significant temperature differences occur in the sealing device. These temperture differences may range to more than 100° C. during heating and cooling. As a result, dimensional changes due to thermal expansion occur in the structural elements of the sealing device resulting in relative movements between the structural elements and, above all, to a sliding action in the known constructions which tends to destroy the sealing surfaces because of cold welding or due to sliding friction. The compensating movements caused by thermal expansion, however, are possible to a limited extent, since the sealing member is unilaterally fixed at the rim in known constructions. In such an arrangement the sealing member may break at the attachment point because of the compensating movements or perhaps only cracks will develop, however, such cracks cause the valve device to leak. It is also possible that the sealing member is plastically and, thus, permanently deformed at the attachment point when the compensating movements are appropriately large with the consequences that the device becomes loose and leaks. Therefore, it is the primary object of the present invention to provide a sealing device formed of metal which permits relatively great compensating and adjusting movements between the parts forming the sealing device without impairing the great sealing capacity of the sealing device described above.

In accordance with the present invention, the sealing ring is fixed on one of the two sealing surfaces by shrinking it on the surface. Shrinking-on means fitting a heated or cooled workpiece onto another member with the subsequent volume change occuring during cooling or heating resulting in a tight bond between the pieces. In the present invention, the attachment of the sealing ring can be made either with the housing or with an adjustable part of the valve. Therefore, the sealing ring is fixed to the sealing surfaces, however, it is still movable to the required extent so that the same surface portions contact one another along the same lines when the sealing device is repeatedly opened and closed. The sealing member or sealing ring is movable relative to the two sealing surfaces by rolling and has a high degree of adjustment adaptation, since both of the edges or surfaces of the sealing member disposed in operative engagement with the sealing surfaces are rounded off and the width of the sealing member in the radial direction is approximately equal to twice the radius of curvature of the rounded contact surfaces. Accordingly, the sealing member can roll on each of the sealing surfaces when the sealing device is opened or closed or when movements occur due to thermal expansion, without the development of any sliding friction which results in cold welding and thereby causes destruction of the sealing surface. Advantageously, the ratio of thickness to the radial width of the valve body cross-section is in the range of about 1:3-1:10 so that the sealing member or ring is able to absorb any deformation in itself, that is, in the elastic range which occur because of the great sealing force acting on the sealing member. The sealing surfaces as well as the sealing member are formed of materials which are practically non-ductile, that is, nickel material with a nickel content of 35% and more with chromium and/or cobalt as additional alloy components; stellites and alloys of high-grade steel with chromium, nickel molybdenum and/or titanium can also be used. Microscopically small plastic deformations occur at the sealing surfaces during the rolling action. The substantial closing pressures developed as the device is repeatedly opened and closed only cause a superficial deformation in the elastic range. If the position of the rolling sealing zone is changed, however, this tends to lead to leakage.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a half longitudinal sectional view taken through an open high-vacuum valve embodying the present invention;

FIGS. 2, 3 and 4 are partial views of a portion of the valve shown in FIG. 1 on an enlarged scale each illustrating a different embodiment of the sealing surfaces;

DETAIL DESCRIPTION OF THE INVENTION

Figure 5:
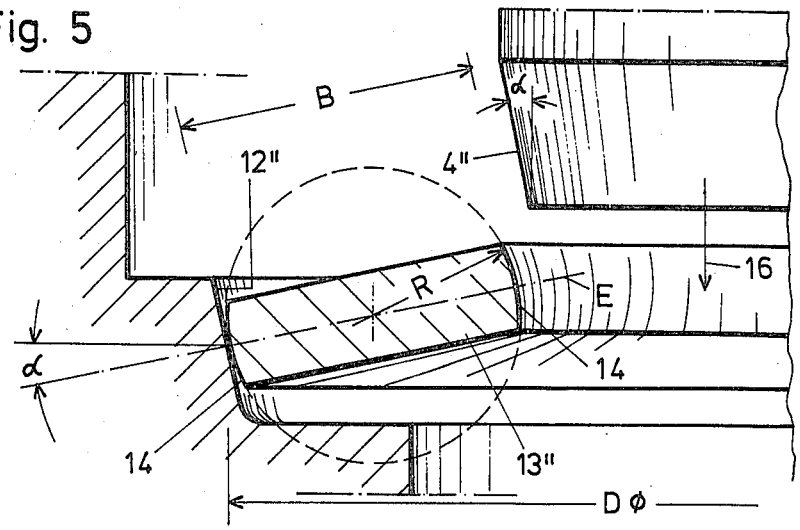
FIGS. 5 and 6 are detail representations of another embodiment of the present invention with the valve shown in the open position in FIG. 5 and in the closed position in FIG. 6.

In FIG. 1 a half longitudinal section of a high-vacuum stop valve is illustrated including a housing 1 having a connecting pipe 2 acting as the connection to a high-vacuum pump and with an opening 3 in the housing for connection to the device to be evacuated. One sealing surface of the valve is formed by a frusto-conically shaped sealing plate 4 fastened to a suitable carrier 5 or the plate and carrier can be constructed as a single unit. To displace the sealing plate 4 relative to the other sealing surface 12 within the housing 1, the carrier 5 is connected to a spindle having a thread, in FIG. 1 only the upper connecting end 6 of the spindle is visible. The spindle 6 is supported in a housing cover 7 rigidly connected to the housing 1 by bolts 8. To seal the spindle, a flange plate 9 is placed in the upper opening of the housing 1 with a metal bellows 10 surrounding the spindle and fixed in a tight manner to the flange plate 9 with the lower end of the metal bellows 10 being fixed tightly to the carrier 5. A sealing ring 11 is located in an annular step between the upper end of the housing 1 and the flange plate 9.

Sealing surface 12 formed in the housing 1 is a frusto-conical surface. The seal between the sealing surface 4 and 12 is afforded by a ring of a non-ductile material which acts as the sealing member 13. In this embodiment, ring 13 has been shrunk onto the sealing surface 12 by cooling the ring to a very low temperature prior to inserting it into contact with the sealing surface 12. Due to the cooling action, the outside diameter of the ring 13 has been reduced and can be fitted onto the frusto-conical sealing surface 12. As the ring expands while its temperature increases, it is automatically clamped on the frusto-conical surface 12 without requiring any additional securing means, such as holders or the like, for fixing its position. Though the ring 13 is tightly fixed on the sealing surface 12, this does not preclude the possibility that the ring rolls on the sealing surface 12 to the extent required when the valve is opened and closed. In FIG. 1 the valve is shown in the open position. Each of the sealing surfaces 4, 12 which interact with the sealing member are constructed as frusto-conical surfaces. The invention, however, is not limited to such surface configurations. In FIG. 2 a detail is provided of that portion of FIG. 1 within the circular dot-dash line. The detail in FIG. 2 is on a much larger scale as compared to FIG. 1. Sealing member 13' is in the form of a ring with a solid cross-section and is shrunk onto the sealing plate 4' which has a cylindrical shape. Instead of a conical surface and a cylindrical surface forming the sealing surfaces, it is possible to employ spherical surfaces or some combination of these surfaces. Other possible arrangements of the seal are illustrated in FIGS. 3 and 4. In these two embodiments, the sealing ring 13' is shrunk onto the sealing plate 4'. The firm engagement of the sealing ring is ensured, because the generating angle of the sealing surface is smaller than the friction angle in that region in which the shrunk-on sealing ring bears against the sealing surface. As a result of this shrunk fit, the sealing member is held relative to the sealing surface against which it bears in the same initial position at any temperature and in any operating condition of the device.

Since a ring or torus-shaped member of non-ductile material is extremely torsion-resistant, it is advantageous to produce the sealing member as a frusto-conical annular disc. As compared to FIG. 1, such an embodiment is illustrated on an enlarged scale in FIGS. 5 and 6 with the valve illustrated in the open position in FIG. 5 and in the closed position in FIG. 6. Sealing member 13" is in the form of a frusto-conical annular disc with the inner and outer edges or surfaces 14 being rounded and these rounded surfaces engage the sealing surfaces 12" and 4" when the valve is closed, note FIG. 6. The rounded surfaces 14 have the radius of curvature R corresponding to one-half the radial width B of the annular disc. In this embodiment, annular disc 13" is shrunk onto the radially outer sealing surface 12" so that no additional support for maintaining the sealing member in the fixed position is required. For the sake of completeness, it should be noted that the disc-shaped sealing member 13" could also be shrunk onto the radially inner frusto-conical sealing surface 4" of the adjustable part of the valve. Regardless of whether the sealing member is shrunk onto one or the other of the sealing surfaces, the individual parts are adjusted relative to one another so that the median plane E of the annular disc 13" extends perpendicularly relative to the frusto-conical surface 12" when the valve is opened, that is, the median plane E coincides with the surface normal to the contact point or on the contact line. The radially inner sealing surface 4" is moved into contact with the annular disc 13' in the direction of the arrow 16 shown in FIGS. 5 and 6 moving the spindle in the desired direction. The middle zone of the frusto-conical sealing surface 4" contacts the radially inner edge 14 of the sealing member 13", the radially inner edge or surface being rounded and having a convex configuration. The middle diameter of the frusto-conical sealing surface 4" corresponds approximately to the inner diameter d of the annular disc 13". The first contact of these parts with another during the closing operation is illustrated in FIG. 6. In this embodiment, the sealing surfaces 4", 21" are in parallel relation with respect to one another.

If an appropriately great closing pressure is subsequently applied through the spindle 6, the sealing surface 4" continues to travel in the axial direction designated by arrow 16 with the surfaces bearing against one another being superficially deformed in the elastic range due to the high pressure acting when these parts are pressed together. As a result of the selected arrangement, the force applicced by the spindle 6 is increased in a high step-up ratio and this ratio is primarily determined by the angle α which correspond to the generating angle of the frusto-conical surfaces shown in FIGS. 5 and 6. In this embodiment, the disc-like sealing member 13" rolls with its two convex rounded surfaces or edges 14 on the sealing surfaces 4"', 12". Sealing member 13" can also be deformed more or less as a unit. The extent of such deformation depends, among other things, on the thickness S of the disc-like sealing member, that is, its dimension extending generally in the axial direction of the valve, note the thickness S shown in FIG. 6. With respect to the relative movement of the parts and, particularly, the rolling movement mentioned above, it should be noted that these movements and rolling paths are very small because of the sealing surfaces 4", 12" as well as of the sealing member 13" which are formed of non-ductile, metallic materials. The ratio of the thickness S to the width B of the solid sealing member cross-section is about 1:3–1:10, so that the sealing member is able to absorb deformations within its own structure, that is, in its elastic range. It can be seen from FIG. 6 that even relatively large axial movements between the sealing surfaces 4", 12", such as caused by thermal expansion or thermal differences, can be easily absorbed in this sealing arrangement since the sealing member 13" rolls on both sides or edges on the sealing surfaces without impairing the sealing capacity, because the high sealing forces applied through the spindle 6 permit such differences without any problems.

Figure 6:
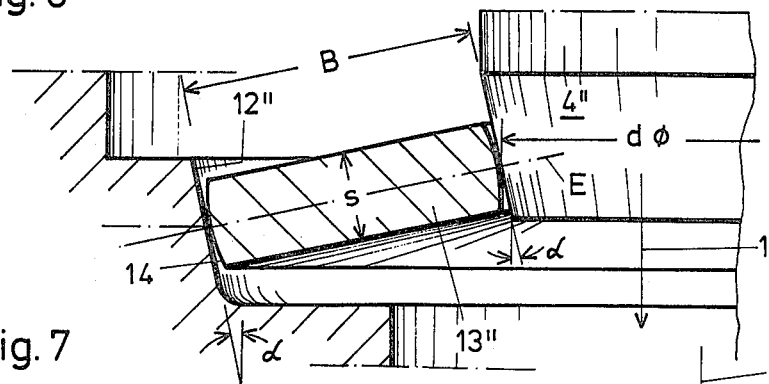

In the embodiment displayed in FIGS. 5 and 6, the sealing surfaces 4", 12" are frusto-conically shaped. An effective sealing action can also be obtained if these sealing surfaces are constructed as spherical surface zones, that is, either concave or convex. It is also possible to have a conical surface and a spherical surface as the sealing surfaces in the sealing device, since these surfaces are not in direct contact with one another during the closing action. These surfaces are always constructed in such a way that the sealing member, that is, its rounded edges or surfaces can roll on the sealing surfaces without obstruction during the opening and closing action. When referring to rolling in this connection, it is pointed out that the distances traveled and the deformations are very small because of the hard, non-ductile materials used in forming the surfaces of the sealing device so that the elastically deformable range of the material is not exceeded by the externally applied forces.

Figure 7:
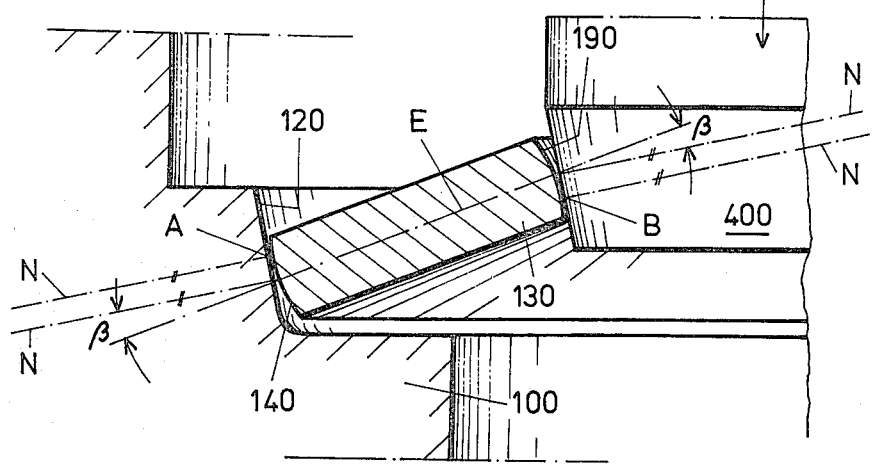
FIG. 7 is a view similar to FIGS. 5 and 6 displaying a detail of another embodiment similar to the one shown in FIGS. 5 and 6.

Another advantageous arrangement is possible when the sealing member 130 is constructed as a frusto-conical annular disc and is inserted so that with the sealing member unloaded or at the commencement of its contact during the closing procedure, the median plane E of the sealing member 130, note FIG. 7, includes an angle β with the surface normal plane N along the contact line A or B. Due to this arrangement, the contact lines A and B between the sealing member 130 and the frusto-conical sealing surfaces 120 and 140 are located slightly offset from the median plane E when the first contact occurs during the closing procedure, that is, with regard to the contact lines A the contact is above the median line and with regard to the contact line B of the contact is below the median plane E. When the sealing pressure is applied in the direction of the axis as shown by the arrow 200, the sealing member 130 rolls on the sealing surfaces and the contact lines A and B shift toward the median plane E so that these contact lines A, B are essentially aligned with the median plane E when the sealing device is closed. The adjusting movements and the relative movements caused by temperature changes and temperature differences during the heating of the sealing device and occurring between the various parts of the seal can be positive or negative relative to the median of the plane E. In both cases, sufficient tolerance ranges are provided for the adjustment of the sealing member 130 without causing the sealing or contact lines to deviate substantially from the median plane E.

If the radius R of the sealing surfaces around the radially inner and outer edges of the disc-shaped sealing member is less than half its width, the rolling-in action during the closing pressure can be such that the contact lines A, B travel through the cross-sectional plane of the valve so that subsequently no additional closing force is required for maintaining this position. As a result, the valve is automatically locked and can be opened only by applyng an external opening force acting in the direction of the arrow 200.

The valve actuation or the actuation of the spindle can be effected pneumatically or mechanically. In the latter case, springs or sets of springs are provided which automatically form axial compensating movements when dimensional changes have occurred due to temperature differences.

While specific embodiments of the invention have been shown and described in detail to illustrate the application of the inventive principles, it will be understood that the invention may be embodied otherwise without departing from such principles.

What is claimed is:

1. Metallic sealing device for a high-vacuum closure where the sealing device is repeatedly opened and closed, such as a high-vacuum valve, comprising a first sealing surface formed as a surface of revolution, a second sealing surface formed as a surface of revolution, said first and second sealing surfaces being coaxial, said sealing surfaces being repeatedly adjustable relative to one another in the axial direction for movement between an open position and a closed position, a metallic sealing ring located between said first and second sealing surfaces, said sealing ring having a cross-sectional configuration capable of rolling on said sealing surfaces when said first and second sealing surfaces are moved relative to one another between the open and closed positions, said sealing ring consists of a substantially non-ductile material, in the closed position of the sealing device the sealing forces act on said first and second sealing surfaces and on said sealing ring in the range of exclusively elastic deformation, said sealing ring being fixed to one of said first and second sealing surfaces by shrinking said sealing ring theron, the generating angle of said first and second sealing surfaces in the region of contact with said sealing ring is smaller than the friction angle, and at least the surfaces of said sealing ring in contact with said first and second sealing surface have a rounded convex configuration.

2. Metallic sealing device, as set forth in claim 1, wherein said sealing ring has a solid cross-section.

3. Metallic sealing device, as set forth in claim 1, wherein said sealing ring being formed as a frusto-conical annular disc, and the width of said annular disc measured in the direction extending radially relative to the axis of said first and second sealing surface is approximately twice the radius of curvature of the rounded contact surfaces of said annular disc which engages said sealing surfaces.

4. Metallic sealing device, as set forth in claim 3, wherein when the sealing device is in the open position, the median plane of said sealing member extending transversely of the axis of said first and second sealing surfaces and spaced equidistantly from the surfaces of said sealing member extending transversely of the axial direction of the sealing surfaces forms an acute angle with a plane normal to the line of contact between said annular disc and said sealing surface onto which said annular disc is shrunk on and the force acting on said annular disc as the sealing device is moved into the closed position reduces said angle.

5. Metallic sealing device, as set forth in claim 4, wherein said annular disc being arranged so that as the closing force is applied as the sealing device is moved into the closed position, with the closing force increasing, the initially positive acute angle between the median plane of said annular disc and the sealing surface becomes a negative acute angle.

* * * * *